(12) United States Patent
Hentschel

(10) Patent No.: US 6,246,447 B1
(45) Date of Patent: Jun. 12, 2001

(54) VIDEO FORMAT ADAPTIVE BEAM SIZE FOR VIDEO MOIRE REDUCTION

(75) Inventor: Christian Hentschel, Hawthorne, NY (US)

(73) Assignee: Philips Electronics North America Corporation, New York, NY (US)

(*) Notice: Subject to any disclaimer, the term of this patent is extended or adjusted under 35 U.S.C. 154(b) by 0 days.

(21) Appl. No.: 08/976,710

(22) Filed: Nov. 24, 1997

(51) Int. Cl.[7] ............................. H04N 3/22; H04N 3/26
(52) U.S. Cl. .................. 348/806; 348/607; 315/382.1; 315/382; 315/370
(58) Field of Search ............................ 348/806, 807, 348/189, 607; 315/382, 371, 10, 382.1, 370; 313/414; H04N 3/22, 3/26

(56) References Cited

U.S. PATENT DOCUMENTS

| | | | |
|---|---|---|---|
| 5,483,128 | * | 1/1996 | Chen ...................................... 315/382 |
| 5,747,933 | | 5/1998 | Beeteson et al. ....................... 315/1 |
| 5,959,414 | * | 9/1999 | Yoshida et al. ....................... 315/382 |

FOREIGN PATENT DOCUMENTS

| | | |
|---|---|---|
| 0707300A2 | 4/1996 | (EP) . |
| 0707418A1 | 4/1996 | (EP) . |
| 575885A | 3/1993 | (JP) . |
| 575886A | 3/1993 | (JP) . |

* cited by examiner

Primary Examiner—Michael H. Lee
(74) Attorney, Agent, or Firm—Edward W. Goodman

(57) ABSTRACT

A video format adaptive electron beam control for causing the spot size of the electron beam to increase for a low resolution signal and for low resolution portions of a high resolution signal, and for causing the spot size of the electron beam to decrease for high resolution portions of the high resolution signal.

6 Claims, 4 Drawing Sheets

$T_1$ = LINE DELAY
T = DELAY, UNSPECIFIED ns and the
VIDEO FORMAT ADAPTIVE BEAM SIZE FOR VIDEO MOIRE REDUCTION

BACKGROUND OF THE INVENTION

1. Field of the Invention

The invention relates in general, to video moiré reduction, and in particular, to a method and device for adaptively defocusing the electron beam size in dependence on the incoming video format.

2. Description of the Prior Art

Moiré is a common word for patterns which look like waves on water. An example in the real world is the interference between two fences on a bridge. Moiré appears when two sampling processes don't match each other and there is no sufficient filtering (interpolation/decimation).

The description of moiré in monitors is complex. The origin is the uncorrelated sampling process between the video format at the electrical side, and the two-dimensional sampling by the shadow mask at the mechanical-optical side. In addition, the scan line frequency and its higher harmonics as they interfere with the shadow mask are responsible for so-called scan line moiré. Scan line moiré is most noticeable when the picture content has constant luminance and no picture details.

Although high resolution video formats and high monitor bandwidth are desirable for sharp and detailed images, the visibility of moiré usually increases with both of these. Reducing scan line moiré is possible by influencing the shape and width of the electron beam itself, but unfortunately, the reduction of moiré by this method and preservation of resolution is a contradiction.

For standard monitors where there is a fixed horizontal and vertical scan frequency, moiré suppression is achieved by choosing a suitable mask pitch (mask sampling frequency ~1/mask pitch) in the horizontal and vertical directions. This is not possible for multi-sync high resolution monitors having large screens which are able to display various video graphics formats. These monitors are optimized for the highest resolution video formats for an electron beam having a very small spot size. In these types of monitors, even if the pitch size is chosen to optimize the reduction of moiré for the high resolution video format, moiré will still appear at lower resolution video formats. Also, taking into account that the customer is allowed to change the window size by about 15%, which changes the distance between pixels, an optimal pitch cannot be found for several scan modes.

European Patent Application EPA 707,300, corresponding to U.S. Pat. No. 5,747,933, describes a moiré detector for controlling the electron beam size in these multi-sync monitors. One of it's main components is an adaptive band-pass filter. The center frequency of the band-pass filter is adjusted to a moiré frequency. In the case where the incoming video signal is at the moiré frequency, or where there are fine details in the video image which match the moiré-frequency, the electron beam is defocused, thus losing resolution in the video image.

SUMMARY OF THE INVENTION

Accordingly, it is an object of the invention to avoid the conflict between increased resolution and increased moiré by using a video format adaptive electron beam spot size.

It is another object of the invention to reduce moiré by increasing the electron beam spot size for incoming low resolution video formats.

It is a further object of the invention to increase the spot size for incoming high resolution video formats when the image regions have low resolution picture content, yet maintaining the small spot size for the image regions which have a high resolution picture content.

It is yet another object of the invention to reduce moiré with minimum loss of resolution.

It is yet a further object of the invention to reduce moiré with minimum loss of sharpness.

It is even another object of the invention to reduce moiré without requiring feedback from the monitor, or the use of adaptive band-pass filters.

It is even a further object of the invention to provide a method and device for reducing moiré which can be used on various active display sizes and screen pitch sizes.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention reference is had to the following drawings.

DETAILED DESCRIPTION OF THE PREFERRED EMBODIMENTS

Figure 1A:
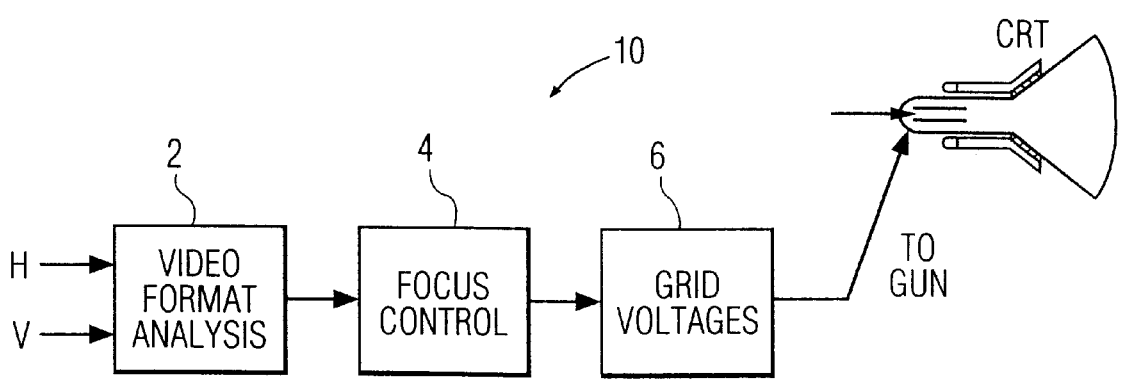
FIG. 1a shows a block diagram of a video format adaptive beam size control.

FIG. 1a depicts a block diagram of a video format adaptive beam size control (10) in accordance with the invention. The invention is centered around determining the resolution of the incoming video signal and adjusting the electron beam spot size in accordance with this resolution. In another embodiment of the invention, the image content of a high resolution video signal is also taken into consideration when determining the electron beam spot size.

The horizontal (H) and vertical (V) synchronizing pulses of the incoming video signal are received by the video format analysis block 2. The video format analysis block 2 calculates the incoming line number per frame of video. This line number can be determined by counting the horizontal synchronizing pulses (H) during a vertical interval (frame display time), measured between two vertical synchronizing pulses (V). If there is a low number of lines per frame, the incoming video signal is considered a low resolution video signal. If there is a high number of lines per frame, then the incoming video signal is considered a high resolution video signal.

Figure 1B:
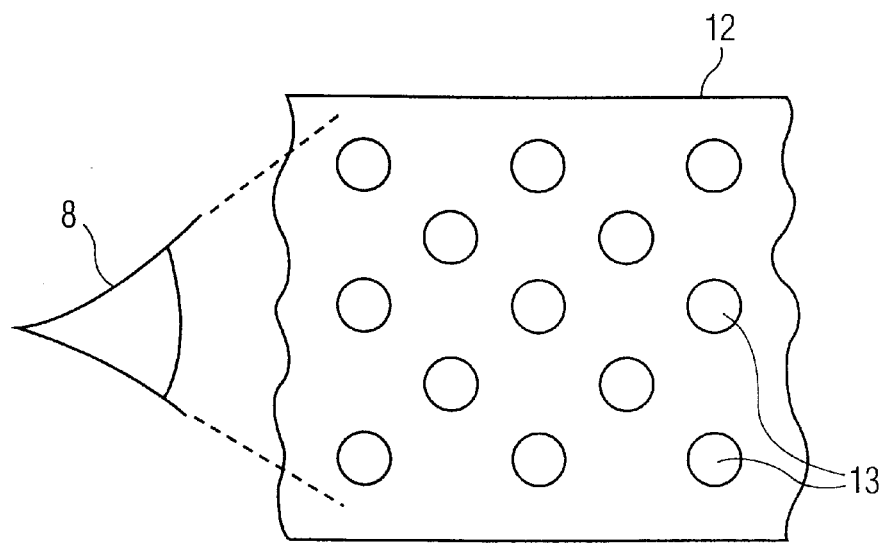
FIG. 1b shows a defocused electron beam (large spot size)
Figure 1C:
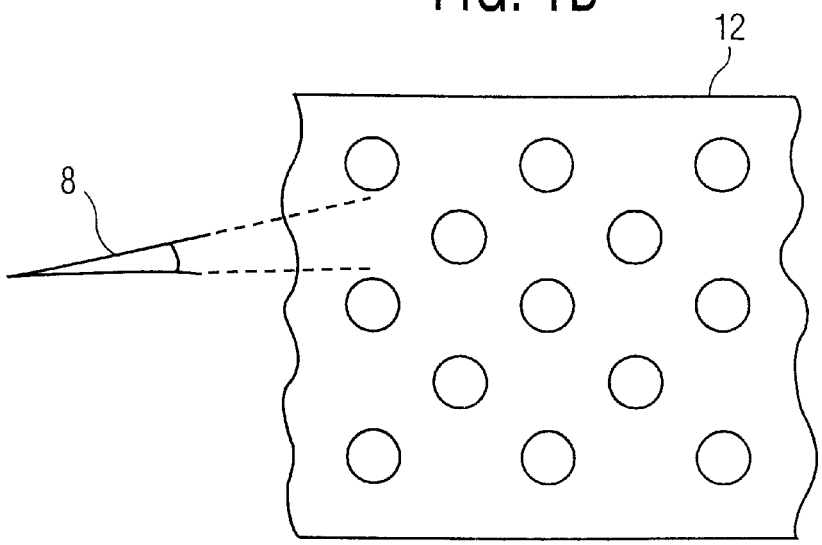
FIG. 1c shows a small focused electron beam spot size.

Since the electron beam spot size is inversely proportion to moiré, it is advantageous to keep the spot size large when either the incoming video is low resolution or if the resolution is not of importance. If the incoming video signal is a low resolution video signal, the focus control 4 causes the grid voltages 6 to defocus the electron beam 8. As shown in FIG. 1b, this defocusing causes the spot size of the electron beam 8 to become larger than the mask 12 pitch (the distance between holes 13 on the shadow mask). This defocusing reduces scan line moiré because the spot width acts as a low-pass filter and reduces the amplitudes of higher harmonics. These higher harmonics could interfere with the shadow mask causing moiré.

Figure 2:
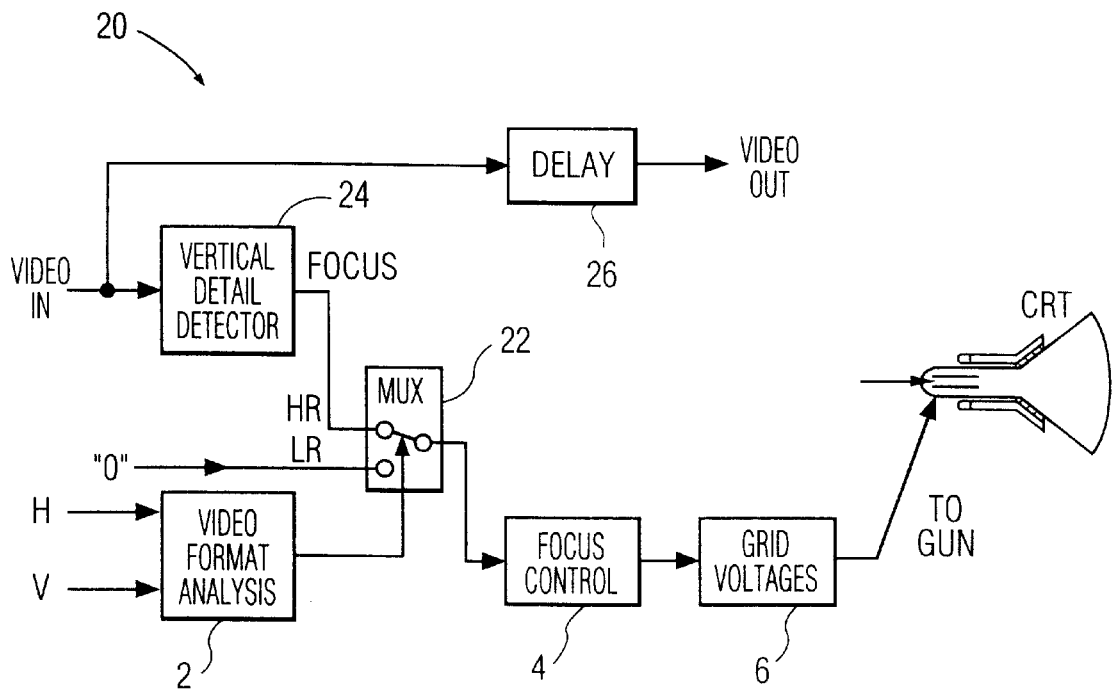
FIG. 2 shows a block diagram of a combined video format and video signal adaptive beam size circuit.

In the case of an incoming high resolution video signal, the removal of moiré is more complicated. FIG. 2 shows a block diagram of a video format and video signal adaptive beam size circuit 20. The basic idea of this embodiment of the invention is to provide a sharp and small electron beam spot size only in image regions with high resolution picture content. In regions without fine details, the electron beam spot size can be defocused without any penalty. The video format analysis circuit 2 is connected to a multiplexer 22 which is switched to the input "0", indicating larger spot size, in the case of a low resolution video format (LR). As explained above, when the incoming video signal is of low resolution, the focus control 4 causes the grid voltages 6 to produce a wider electron beam size. It should be noted that the beam size can be asymmetrical, a wider (defocused) electron beam size is mainly necessary in the vertical direction to reduce scan line moiré.

Figure 4:
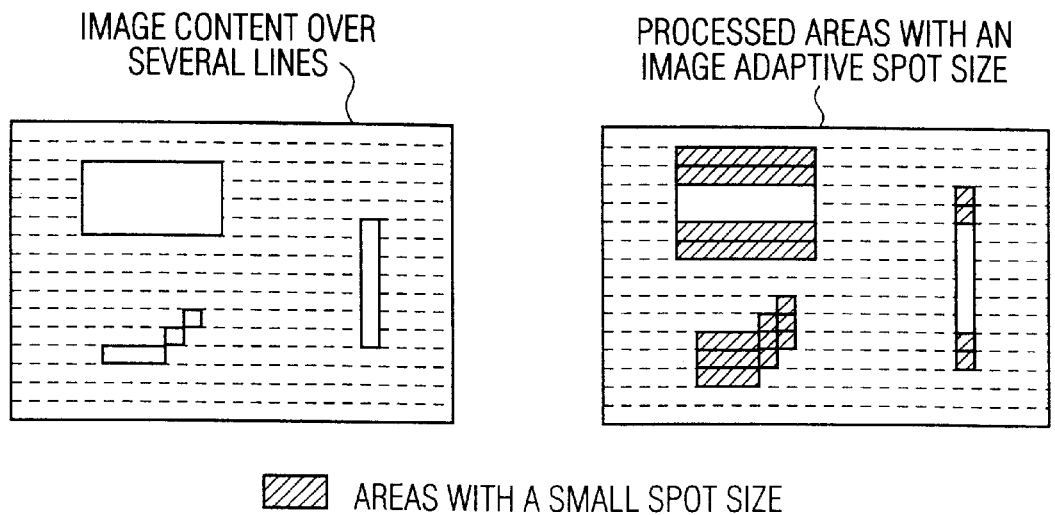
FIG. 4 shows an example of a picture having high resolution portions and low resolution portions.

If a high resolution video signal is detected (HR), the multiplexer 22 is connected to a vertical detail detector 24 which controls the focus size of the electron beam dynamically depending on the image content. The general operation of the vertical detail detector 24 is to detect vertical transitions in the picture. A vertical transition is, for instance, from black to white or from white to black. FIG. 4 shows an example of a picture with vertical transitions, and the position in the picture where a small spot size should be used and the position where a large spot size should be used. If a vertical transition is detected, it means there is detail in the image which should be displayed using the high resolution format, which corresponds to a small electron beam size. If no vertical transition is detected, (i.e a low resolution format will suffice) the electron beam is defocused. Thus, when the picture content is of constant luminance and little vertical detail, the electron beam is defocused and scan line moiré is drastically reduced. (The delay 26 in FIG. 2 compensates for the propagation delay from the receipt of the video signal to the gun and also for the delay during focus control.)

Figure 3:
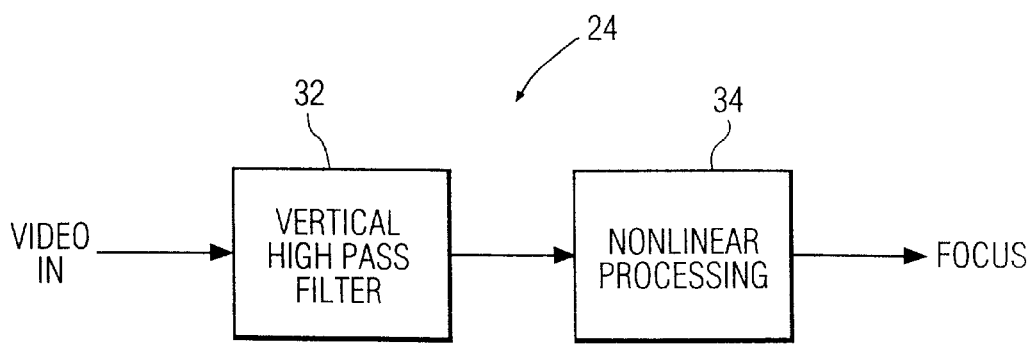
FIG. 3 shows the components of a vertical detail detector.

The key components of the vertical detail detector 24 are shown in FIG. 3. A vertical high-pass filter 32 lets high spatial frequencies pass. High spatial frequencies correspond to vertical transitions or fine detail. In the case of a vertical transition, a small electron beam spot size should preserve all information. Low spatial frequencies (no vertical detail) cannot pass the filter. If no vertical detail is present, (i.e. a defocused electron beam) the output of the high pass-filter is zero. Since a vertical transition is, for instance, from black to white or from white to black, this results in a negative or positive output value, respectively, from the high pass filter 32. For vertical transitions, the sign of the signal is irrelevant and only the absolute value is important. The generation of the absolute value is a nonlinear process and depicted by the nonlinear (absolute value) processing block 34. The nonlinear processing block 34 can include further post processing, examples of which are shown in the next figures. Thus, the output of the vertical detail detector 24 (FIG. 2) is either a positive value or "0". If a zero is provided, the multiplexer 22 provides a "0" to the focus control 4 indicating an increase in spot size. If the output of the vertical detail detector 24 is a positive value, then the focus control 4 receives this positive value through the multiplexer 22 and the spot size is reduced.

Figure 5:
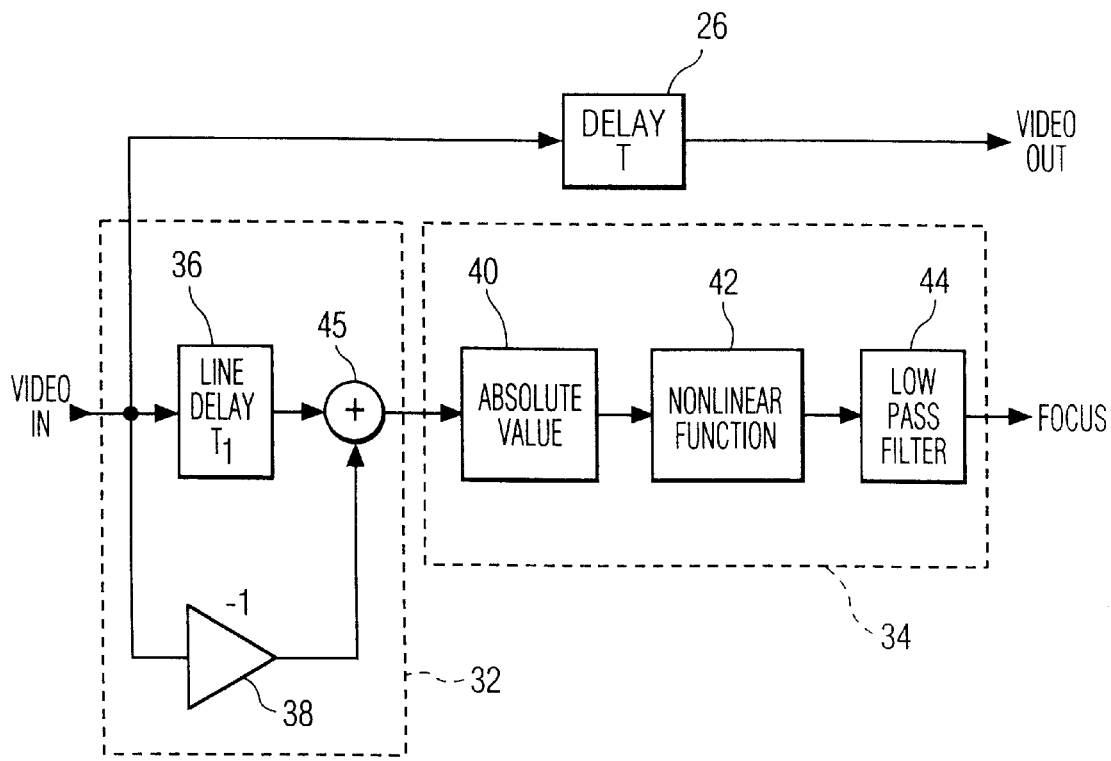
FIG. 5 shows a video adaptive focus control.

FIG. 5 shows a video adaptive focus control where the nonlinear processing block 34 includes further processing. A vertical high-pass filter 32 consists of a line delay 36 and a a subtractor 38, 45 (an adder 45 with one inverted input 38). The incoming video signal is subtracted from the delayed signal and connected to the absolute value block 40. The nonlinear function block 42 transforms the incoming signal, for example, by suppressing low amplitudes or limiting large amplitudes, and any values between being processed by a constant gain or any other nonlinear characteristic. This causes very small transitions to be suppressed while maintaining the sharpness of other transitions.

In a preferred embodiment of the invention, the amplitude range is normalized between "0" and "1". A "0" indicates no vertical details in the image, and the electron beam can be defocused without penalties. A '1' indicates a vertical transition or vertical detail, therefore, the electron beam should be focused to preserve the detail information. The low-pass filter 44 eliminates a typical drawback of such nonlinear signal processing. Without the low-pass filter 44, the fast focusing and defocusing creates artificial artifacts in the image. The low-pass filter 44 provides soft switching, over more than one pixel, to avoid these additional artifacts. The delay 26 is inserted in the video signal path to compensate for the horizontal propagation, or group delay T, of the video adaptive focus control processing. The defocusing should be synchronized with the video signal to get an optimal result (i.e., the propagation delay of the video signal should be equal to the defocussing delay).

The vertical high-pass filter 32, having only one line delay 36, has a geometrical vertical group delay of half the distance between two lines. Typically, the video line entering the line delay 36, or the output of line delay 36, is connected to delay 26 which causes an error in the vertical group delay by half of a line between the video signal and the focus signal. There is no vertical group delay compensation possible in this circuit.

Figure 6:
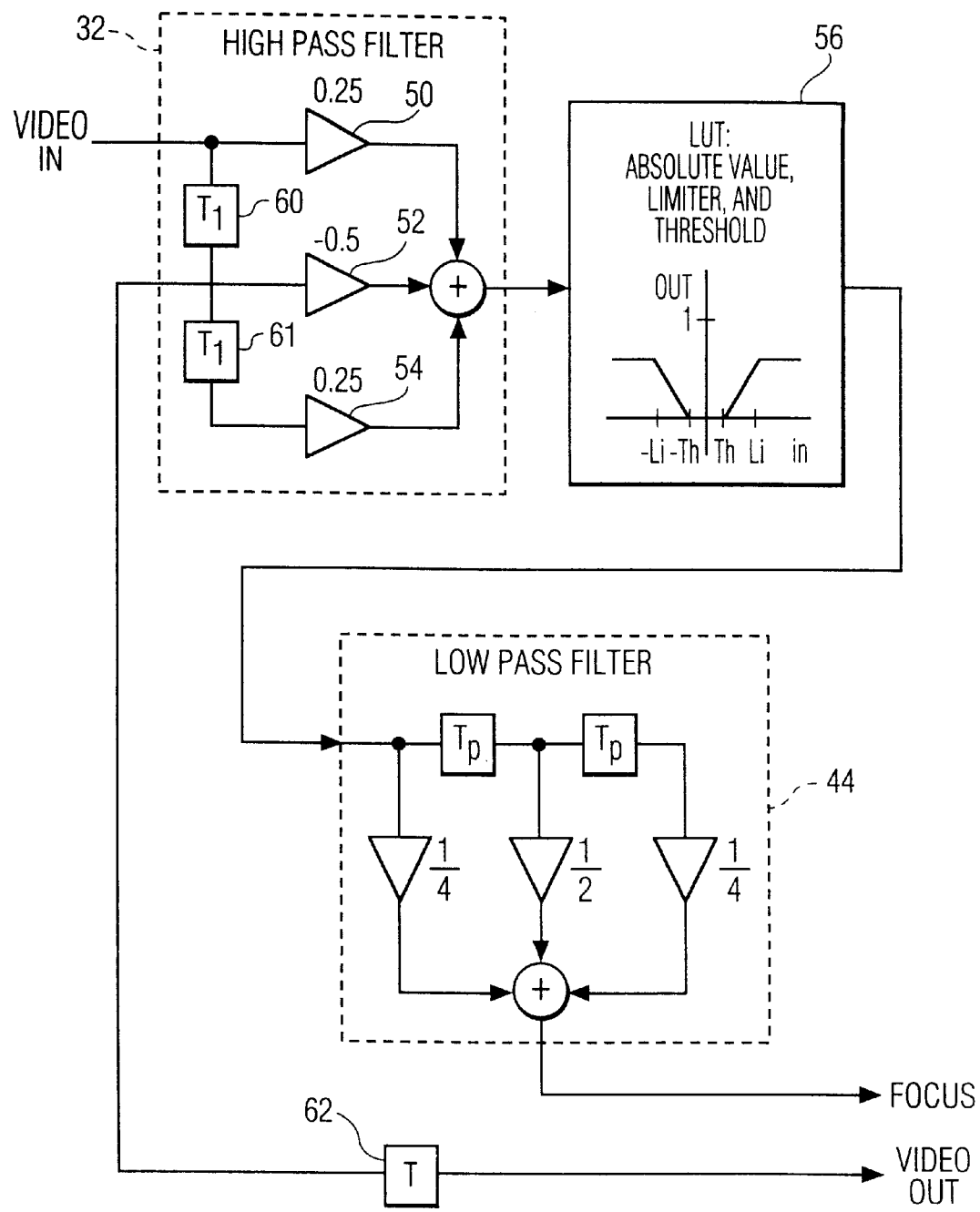
FIG. 6 shows a video adaptive focus control with better group delay compensation.

FIG. 6 removes this drawback by having two line delays (60, 61) $T_1$. With the proposed coefficients 0.25, –0.5, 0.25, the vertical group delay for the filter becomes exactly the vertical distance of one line. The first line delay $T_1$ (60) is also used for the vertical delay of the video signal, with the advantage of minimized hardware expenditure. The additional delay T (62) in the video signal path compensates for the horizontal propagation delay, thereby synchronizing the delays of the signals "Focus" and "Video Out".

After the high-pass filter 32 a look up table (LUT) 56 can be used for creating the absolute value, and it will include any additional nonlinear function. The LUT 56 replaces the absolute value block 40 and the nonlinear function block 42. The output values are normalized and range from "0" to "1". In this example, input values smaller than the threshold value Th produce a '0' value at the output, and values above the limiter value Li produce a "1" at the output. The following low-pass filter 44, with the coefficients 0.25, 0.5, 0.25, has a $\cos^2$-shape of the frequency response. Advantages of this filter, with a soft slope between pass and stoppband, are that there is no introduction of ringing, there is a constant group delay, and, overall, the expenditure of the hardware is small.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

What is claimed is:

1. A device for adaptively adjusting an electron beam spot size in dependence on the video format of an incoming video signal, said device comprising:

an input for receiving an incoming video signal;

a video format analyzer coupled to said input for detecting the video format of the incoming video signal;

a vertical detail detector also coupled to said input for detecting vertical detail in the incoming video signal;

means for controlling a focus of the electron beam spot; and control means for providing a control signal for said focus control means for causing the electron beam spot size to increase if the video format of the incoming video signal is low resolution, and for causing the electron beam spot size to decrease if the video format of the incoming video signal is high resolution, and for causing the electron beam spot size to decrease for portions of the incoming video signal which are high resolution and which contains no vertical detail as indicated by said vertical detail detector.

2. A device for adaptively adjusting an electron beam spot size in dependence on the video format of an incoming video signal, comprising:

an input for receiving an incoming video signal;

a video format analyzer coupled to said input for detecting the video format of the incoming video signal;

a vertical detail detector also coupled to said input for detecting vertical detail in the incoming video signal;

means for controlling a focus of said electron beam spot; and control means for providing a control signal for said focus control means for causing the electron beam spot size to increase if the video format of the incoming video signal is low resolution, and for causing the electron beam spot size to decrease if the video format of the incoming video signal is high resolution, wherein the control means only causes the electron beam spot size to decrease for portions of the incoming video signal which are high resolution and which contain vertical detail.

3. A method for adaptively adjusting an electron beam spot size in dependence on the video format of an incoming video signal, said method comprising the steps:

detecting the video format of the incoming video signal;

detecting vertical detail in the incoming video signal;

increasing the electron spot size if the video format of the incoming video signal is low resolution;

increasing the electron spot size if the video format of the incoming video signal is high resolution but contains no vertical detail; and decreasing the electron beam spot size if the video format of the incoming video signal is high resolution and contains vertical detail.

4. A device for adaptively adjusting an electron beam spot size for an incoming video signal, comprising:

an input for receiving an incoming video signal;

a video format analyzer coupled to said input for detecting a video format of said incoming video signal;

a vertical detail detector also coupled to said input for detecting vertical detail in the incoming video signal;

means for controlling a focus of an electron beam spot; and a multiplexer having a first input coupled to an output of said vertical detail detector, a second input coupled to a reference signal, and a control input coupled to an output of said video format analyzer, said multiplexer providing a control signal for said focus control means for controlling the electron beam spot size in dependence on the video format and the vertical detail.

5. The device as claimed in claim 4, wherein the vertical detail detector includes group delay compensation.

6. A device for adaptively adjusting an electron beam spot size of an incoming video signal, comprising:

a vertical high-pass filter for passing high spatial frequencies in the video signal, and for blocking low spatial frequencies;

a nonlinear processor for processing the high spatial frequencies;

a video format analyzer for detecting the video format of the video signal; and a multiplexer coupled to the nonlinear processor and the video format analyzer, for providing the output of the nonlinear processor if a high resolution signal is detected by the video format analyzer, and for blocking the output of the nonlinear processor if a low resolution video signal is detected, thereby providing a signal for controlling the electron beam spot size.

* * * * *